US012601243B2

(12) United States Patent
Bommareddy et al.

(10) Patent No.: US 12,601,243 B2
(45) Date of Patent: Apr. 14, 2026

(54) FLUID INJECTION FOR DEHYDROGENATION

(71) Applicant: Saudi Arabian Oil Company, Dhahran (SA)

(72) Inventors: Sampath K Bommareddy, Sugar Land, TX (US); Harun Ates, Houston, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/625,955

(22) Filed: Apr. 3, 2024

(65) Prior Publication Data

US 2025/0314163 A1 Oct. 9, 2025

(51) Int. Cl.
*E21B 43/24* (2006.01)
*C01B 3/26* (2006.01)
*E21B 43/16* (2006.01)

(52) U.S. Cl.
CPC ............ *E21B 43/2401* (2013.01); *C01B 3/26* (2013.01); *E21B 43/168* (2013.01); *C01B 2203/0277* (2013.01); *C01B 2203/1241* (2013.01)

(58) Field of Classification Search
CPC ..... E21B 43/2401; E21B 43/168; C01B 3/26; C01B 2203/0277; C01B 2203/1241
See application file for complete search history.

(56) References Cited

U.S. PATENT DOCUMENTS

| | | | |
|---|---|---|---|
| 7,036,583 B2 | 5/2006 | de Rouffignac et al. | |
| 8,024,930 B2 | 9/2011 | Bommareddy et al. | |
| 2004/0168811 A1* | 9/2004 | Shaw ...................... | E21B 41/02 |
| | | | 166/368 |
| 2007/0056726 A1* | 3/2007 | Shurtleff ................. | E21B 43/24 |
| | | | 166/57 |
| 2008/0066918 A1* | 3/2008 | Smith .................... | C09K 8/594 |
| | | | 166/308.2 |
| 2023/0392485 A1* | 12/2023 | Johnson ................. | E21B 43/27 |

FOREIGN PATENT DOCUMENTS

| | | | | |
|---|---|---|---|---|
| WO | WO-0214647 A1 * | 2/2002 | ............. | E21B 43/38 |

OTHER PUBLICATIONS

Boretti et al., "Advances in Hydrogen Production from Natural Gas Reforming," Advanced Energy and Sustainability Research, Jul. 2021, 2(2100097):1-10, 10 pages.

(Continued)

*Primary Examiner* — Tara Schimpf
*Assistant Examiner* — Daniel T Craig
(74) *Attorney, Agent, or Firm* — Fish & Richardson P.C.

(57) ABSTRACT

In-situ pyrolysis of methane includes heating, with a heater of a fluid control system, a fluid composition including hydrogen gas to a first temperature greater than or equal to 300 degrees Celsius. The heated fluid composition is directed to a subterranean reservoir, where it is disposed in contact with a reservoir fluid to cause methane pyrolysis of the reservoir fluid. A catalyst can be disposed in the subterranean reservoir to receive the heated fluid composition and promote contact between the heated fluid composition and the reservoir fluid to cause the methane pyrolysis.

18 Claims, 4 Drawing Sheets

(56) References Cited

OTHER PUBLICATIONS

Jang et al., "An Analytical Heat Transfer Model in Oil Reservoir during Long-Term Production," Energies, Mar. 31, 2022, 15(2544):1-15, 15 pages.

Jang, "Wellbore and Near-Wellbore Heat Transfer: General Theory and Practical Application," A Dissertation for the Degree of Philosophy in Petroleum Engineering, Texas A&M University, Dec. 2021, 117 pages.

Mccarthy et al., "The Heat Transfer Characteristics of Gaseous Hydrogen and Helium," Rocketdyne, A Division of North American Aviation, Inc., Dec. 1960, 386 pages.

Simpson et al., "Exergy Analysis of Hydrogen Production via Steam Methane Reforming," SAND2006-7471P, Nov. 1, 2006, 20 pages.

Wongsakulphasatch et al., "Chapter 5—Intensified processes of steam reforming and their materials for hydrogen production," New Dimensions in Production and Utilization of Hydrogen, 2020, pp. 117-142, 26 pages.

\* cited by examiner

300

306

304

302

Injection gas

Reaction Products

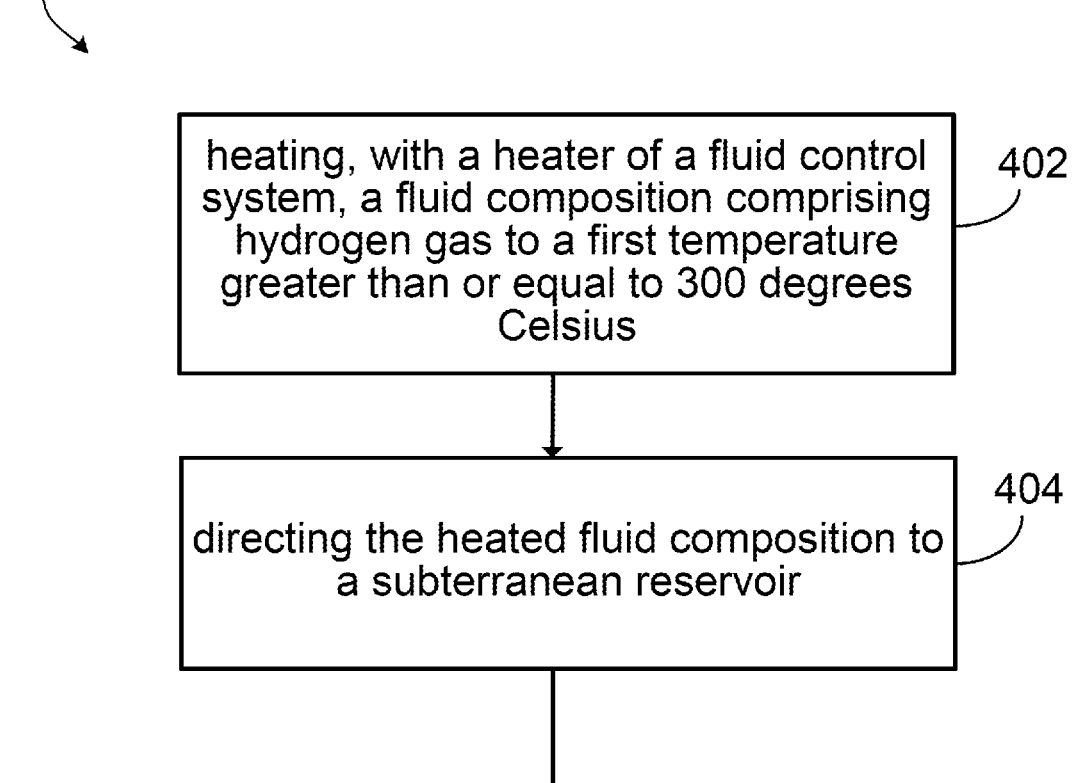

| heating, with a heater of a fluid control system, a fluid composition comprising hydrogen gas to a first temperature greater than or equal to 300 degrees Celsius | 402 |

| directing the heated fluid composition to a subterranean reservoir | 404 |

| disposing the heated fluid composition in contact with a reservoir fluid in the subterranean reservoir to cause methane pyrolysis of the reservoir fluid | 406 |

FIG. 4

FLUID INJECTION FOR DEHYDROGENATION

TECHNICAL FIELD

This disclosure relates to methane pyrolysis and fluid injection systems for use in hydrocarbon wells.

BACKGROUND

Hydrocarbon wells are used to access and extract hydrocarbons, such as natural gas, from hydrocarbon reservoirs. Hydrocarbon wells often include a production well for producing the hydrocarbons from a reservoir and an injection well for injecting fluid back into the reservoir. The produced hydrocarbons are transported to a surface facility for processing, and the fluid for injection is transported from the surface facility to the injection well.

SUMMARY

This disclosure describes fluid injection systems and methods for injecting a heated fluid composition including hydrogen gas into a reservoir to cause methane pyrolysis within the reservoir.

In-situ pyrolysis of methane includes heating, with a heater of a fluid control system, a fluid composition including hydrogen gas and helium to a first temperature greater than or equal to 300 degrees Celsius. The heated fluid composition is directed to a subterranean reservoir, where it is disposed in contact with a reservoir fluid to cause methane pyrolysis of the reservoir fluid. A catalyst can be disposed in the subterranean reservoir to receive the heated fluid composition and promote contact between the heated fluid composition and the reservoir fluid to cause the methane pyrolysis.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a schematic partial cross-sectional side view of an example catalyst that can be used in the example well system of FIG. 1 or the second example well system of FIG. 2.

FIG. 4 is a flowchart describing an example method for in-situ pyrolysis of methane.

Like reference numbers and designations in the various drawings indicate like elements.

DETAILED DESCRIPTION

Figure 1:
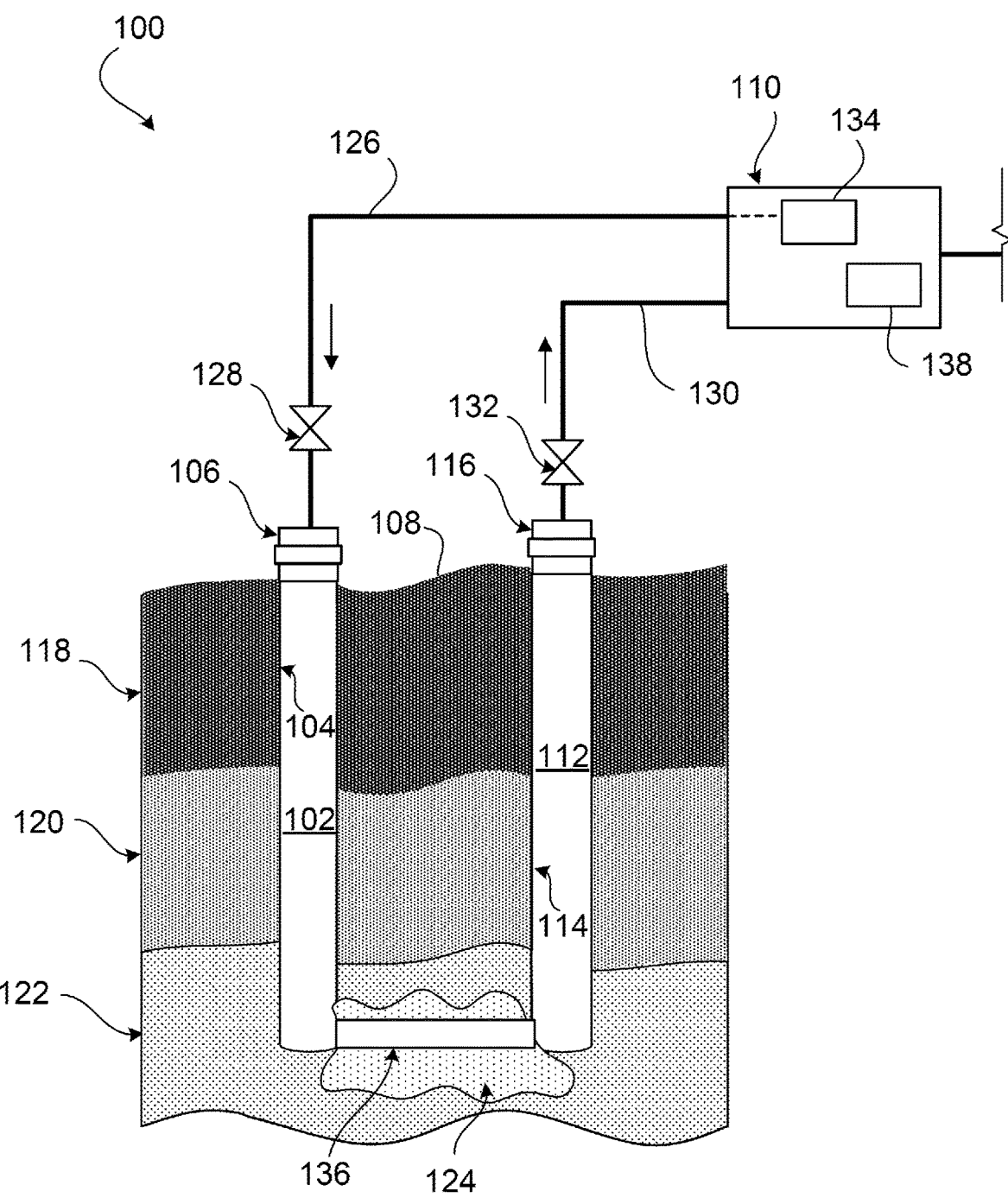
FIG. 1 is a schematic partial cross-sectional view of an example well system including a fluid control system.

This disclosure describes fluid injection systems for directing a heated fluid composition that includes hydrogen gas into a hydrocarbon reservoir to promote in-situ dehydrogenation of hydrocarbon reservoir fluid, such as in-situ pyrolysis of methane, a primary component of natural gas.

A fluid composition that includes hydrogen gas, and in some instances includes helium, is heated to a temperature above 300 degrees Celsius ($°$ C.) at a surface of an injection well, directed to the hydrocarbon reservoir via an injection well, and disposed into the hydrocarbon reservoir to interact with the reservoir fluid in the reservoir. The presence of helium in the fluid composition aids in carrying heat deeper into a downhole formation as a result of helium's higher thermal conductivity relative to industrial gases and chemical stability in a volatile downhole environment. The presence of heated hydrogen gas with the hydrocarbons of reservoir fluid (such as methane) causes a pyrolysis reaction to occur in-situ (for example, downhole in the hydrocarbon reservoir). A result of this pyrolysis reaction includes carbon components such as solid carbon, carbon monoxide (CO), carbon dioxide ($CO_2$), or a combination of these. After the in-situ pyrolysis reaction, at least a portion of the resultant carbon components remains downhole in the hydrocarbon reservoir, for example, instead of flowing toward the surface through a production wellbore.

In some implementations, heat from a surface facility is applied to the fluid composition that includes hydrogen gas and helium to heat the fluid composition to a temperature between 300° C. and 500° C., and the heated fluid composition is transported to the reservoir (such as through an injection well) and introduced to the reservoir fluid for partial conversion of methane within the reservoir into hydrogen. This conversion includes methane pyrolysis, which is the breakdown of methane into hydrogen gas and solid carbon. In some examples, this downhole reaction converts hydrocarbon components into hydrogen, CO, and $CO_2$, with trace amounts of solid carbon. Conducting this chemical reaction within the reservoir enables partial retention of carbon components within the reservoir. In some instances, the in-situ chemical reaction occurs in the presence of a catalyst, such as a catalyst pack in a horizontal well that extends between an injection well and a production well, to promote in-situ methane pyrolysis.

In conventional operations of a hydrocarbon well system, hydrocarbons produced from a reservoir are received and processed in surface facilities, where processing operations like steam methane reforming (SMR) technology introduce the natural gas to steam in a heat reactor in order to combust the natural gas and excess air. The combustion converts natural gas to hydrogen and carbon monoxide, which is then sent for additional processing, such as through a water gas shift reactor and a pressure swing adsorber to convert carbon monoxide to carbon dioxide. The hydrogen is separated out from the remainder of the fluid, and the hydrogen gas produced from the byproduct carbon dioxide is called gray hydrogen. In certain instances, additional downstream processes purify and compress the $CO_2$ prior to transporting the $CO_2$ to an underground storage facility, such as a saline aquifer, or for enhanced oil recovery within an existing reservoir(s).

In the present disclosure, at least some of the chemical reaction that converts hydrocarbons (such as methane in natural gas) into hydrogen gas and carbon components occurs in-situ, or within the reservoir. Conducting these reactions in-situ allows for a reduction of surface-level downstream processing operations that separate, store, or otherwise process the carbon components from natural gas, which thereby reduces energy consumption and energy intensity of the downstream processes, allows for a reduction in costs for capturing, compressing, transporting, and storing the produced $CO_2$, allows for an increase in hydrogen production from the reservoir fluid in the reservoir, allows at least some of the carbon components (such as solid carbon, CO, $CO_2$, or a combination of these) to remain in the reservoir instead of being produced through a production well, or a combination of these advantages. In addition, the energy needed to heat the fluid composition including hydrogen gas and helium at the surface and transport this heated fluid composition to the reservoir is significantly less than the energy required to process an additional volume of $CO_2$ from the production fluid. Also, using helium as a heat carrier for the heated fluid composition is a more efficient and more controlled method for transporting heat to the reservoir, for example, as compared to local microwave heating, mineral insulated heaters, or power cables extending downhole. Heating a fluid composition of hydrogen gas and helium can avoid or reduce energy losses associated with transporting and converting electricity to heat energy, satisfy a strict temperature-controlled environment of a reservoir, and avoids or reduces corrosion or safety concerns of high-power electrical equipment based on the presence of water and sulfur compounds within the reservoir. Additional advantages will become apparent from the present description, drawings, and claims.

FIG. 1 is a schematic partial cross-sectional view of an example well system 100 that includes a fluid control system 110. The example well system 100 includes an injection well 102 and a production well 112. The injection well 102 includes a substantially cylindrical wellbore 104 extending from an injection wellhead 106 at a surface 108 downward into the Earth into one or more subterranean zones of interest. The production well 112 includes a separate, substantially cylindrical wellbore 114 extending from a production wellhead 116 at the surface 108 downward into the Earth into the one or more subterranean zones of interest. In the example well system 100 of FIG. 1, three subterranean zones of interest are shown: a first zone 118, a second zone 120, and a third zone 122, with both the injection wellbore 104 and the production wellbore 114 extending to the third zone 122. One or more or all of the subterranean zones can include a hydrocarbon reservoir from which hydrocarbons, such as natural gas, can be extracted. In the example well system 100 of FIG. 1, the third zone 122 includes a hydrocarbon reservoir 124. The injection well 102 and production well 112 are depicted as vertical wells extending substantially vertically from the surface 108 to the third zone 122 and into the hydrocarbon reservoir 124. The concepts described here, however, are applicable to many different configurations of wells, including vertical, horizontal, slanted, split, deviated, or other wells. In certain instances, the example well system 100 includes a single well, instead of multiple wells.

The injection well 102, production well 112, or both, can be lined with lengths of tubing, called casing, along a portion or all of the longitudinal length of the respective well extending downhole from the respective wellhead. The injection wellhead 106 is installed over the open wellbore 104 on top of the casing of the injection well 102, and the production wellhead 116 is installed over the open wellbore 114 on top of the casing of the production well 112. The wellhead 106 defines an attachment point for other equipment of the well system 100 to attach to the injection well 102. Similarly, the wellhead 116 defines an attachment point for equipment of the well system 100 to attach to the production well 112. The wellhead 106, wellhead 116, or both, can include a valve assembly or a Christmas tree structure including valves used to regulate flow into or out of the wellbore 104, or other wellhead structures.

The example well system 100 of FIG. 1 includes the fluid control system 110, which can be incorporated with other surface equipment at surface facilities located at the surface 108 at or near the injection well 102, production well 112, or both. The fluid control system 110 includes equipment for controlling a flow of fluid into the injection well 102, and in some instances, for controlling a received flow of production fluid produced from the production well 112. The example well system 100 can act as a fluid injection system for a well, where a fluid from the fluid control system 110 is transported to the hydrocarbon reservoir 124 via the injection well 102 and injected into the hydrocarbon reservoir 124. The fluid control system 110 is fluidly connected to the injection well 102 and the production well 112 to direct or receive fluid from the respective wells. In the example well system 100 of FIG. 1, an injection fluid pathway 126 extends from the wellhead 106 to the fluid control system 110 and includes an injection control valve 128 for controlling a flow of fluid through the injection fluid pathway 126. The injection fluid pathway 126 can include tubing, piping, or other fluid passageways for fluid to flow from the fluid control system 110 to the injection well 102. In some implementations, the example well system 100 also includes a production fluid pathway 130 that extends from the wellhead 116 of the production well 112 to the fluid control system 110, and can include a production control valve 132 for controlling a flow of production fluid from the production well 112 through the production fluid pathway 130 and to the fluid control system 110. Similarly, the production fluid pathway 130 can include tubing, piping, or other fluid passageways for fluid to flow from the production well 112 to the fluid control system 110.

The example well system 100 operates to inject a heated fluid composition into the hydrocarbon reservoir 124. The fluid composition includes hydrogen gas, and in some instances, also includes helium. This heated fluid composition, when at a desired temperature range (for example, between 300° C. and 500° C.) and in contact with the reservoir fluid (such as methane, natural gas, or other hydrocarbons) in the reservoir 124, causes in-situ conversion of some or all of the hydrocarbon components of the reservoir fluid into hydrogen, CO, $CO_2$, and trace quantities of solid carbon. This conversion includes the process of methane pyrolysis, where heat is used to split methane ($CH_4$) into hydrogen gas and solid carbon. The reaction time for this conversion can be immediate, for example, such that the reaction time is shorter than the residence time of the fluid composition within the reservoir fluid. In some implementations, methane pyrolysis produces hydrogen without carbon emissions like CO or $CO_2$. The fluid control system 110 operates to receive and heat the fluid composition to a first temperature, such as a temperature greater than 300° C. (for example, between 300° C. and 500° C.), and direct the heated fluid composition to the reservoir 124. The hydrogen gas is part of the chemical reaction that occurs downhole in the reservoir 124, and the helium acts as a heat carrier to transmit the heat obtained at the surface at the fluid control system 110 to the reservoir 124 where the reaction occurs. The helium is not a component of the downhole chemical reaction, instead, it is used primarily as the heat carrier in the fluid composition, for example, to carry heat deeper into a formation as compared to a heated fluid that excludes helium. Helium has a high thermal conductivity relative to industrial gases, which makes helium an advantageous heat transfer medium. Also, helium has a chemical and nuclear stability that enables its use in certain extreme applications, such as the volatile downhole environment.

The fluid control system 110 receives the fluid composition and prepares it for transport to the reservoir 124. The hydrogen gas, helium, or both, of the fluid composition can be sourced from production fluid from the production well 112, from other sources, or from both the production fluid and other sources. Instances where the components of the fluid composition are derived from the production fluid are described in greater detail later with respect to the well system of FIG. 2. In the example well system 100 of FIG. 1, the fluid control system 110 includes a heater 134 to heat the fluid composition to the first temperature. The first temperature can vary based on a desired temperature that promotes a desired chemical reaction and result when disposed downhole within a reservoir. In some instances, the first temperature is equal to or greater than 300° C., and less than or equal to 500° C. This range for the first temperature allows for an acceptable temperature range of the fluid composition that is hot enough to cause desired chemical reactions and methane pyrolysis in-situ, and also low enough to avoid or reduce runaway reactions (such as partial oxidation) and combustion in the downhole environment.

The heater 134 of the fluid control system 110 can include a conduction heater, convection heater, furnace, heat chamber, heat exchanger, or other heater type for raising a temperature of the fluid composition to the first temperature. In some implementations, the heater 134 utilizes heat from other components within the fluid control system 110 or other surface equipment to apply to the fluid composition. For example, the heater 134 can raise the temperature of the fluid composition using heat from concentrated solar energy, process heat generated from surface equipment (such as hydrogen production processing equipment), combustion heat from waste gas, a combination of these or other heat sources.

The injection fluid pathway 126 directs a flow of the heated fluid composition from the fluid control system 110 to the injection well 102, such as to a tubing residing in the wellbore 104 of the injection well 102 and extending toward the reservoir 124. In some examples, the tubing extends from the injection wellhead 106 to an inlet end of a horizontal bore through the reservoir 124, such as to a catalyst 136 (described later) in the reservoir 124. The tubing acts to guide or direct the fluid composition through the injection wellbore 104 to the reservoir 124, for example, without infiltration by other fluid(s) residing in the injection well 102. The tubing can be insulated in order to maintain a temperature of the fluid composition through the tubing with minimal or no impact from a temperature of other fluid(s) in the injection well 102. In some implementations, the injection control valve 128 can control a flow rate, pressure, temperature, or a combination of these of the fluid composition prior to the fluid composition flowing into the injection well 102 toward the reservoir 124. For example, the control valve 128 regulates the flow of the stream of fluid composition through the injection fluid pathway 126 and to the reservoir 124 to provide the required heat for enabling the desired chemical reactions and methane pyrolysis in-situ, specifically, within the reservoir 124. The control valve 128 can be controlled by a controller 138 (described later) that can provide a signal to the control valve 128 based on inputs received from the fluid stream through the catalyst 136, the fluid stream through the production fluid pathway 130, including pressure characteristics, temperature measurements, gas compositional conditions, or a combination of these, in order to determine and apply an appropriate flow rate through the control valve 128.

The heated fluid composition reacts with the hydrocarbon fluid in the reservoir 124. The heated fluid composition can include hydrogen gas, helium, methane, other impurities, or a combination of these components. In some implementations, the reaction between component(s) of the heated fluid composition and component(s) of the hydrocarbon fluid can be aided by the presence of a catalyst at a reaction zone. For example, the example well system 100 includes a catalyst 136 in the form of a catalyst pack disposed in the subterranean reservoir 124 and fluidly connected to the injection fluid pathway 126 (for example, via the injection well 102) to receive the heated fluid composition. The catalyst 136 promotes one or more of the chemical reactions occurring between the fluid composition and the reservoir fluid, such as dehydrogenation of methane during methane pyrolysis. For example, the catalyst 136 can include a catalyst surface including a catalyst material with an affinity for molecular adsorption, where methane is adsorbed on the catalyst surface and then dissociated following a sequence of dehydrogenation reactions.

The catalyst material can vary. In some examples, the catalyst material includes iron, cobalt, nickel, another alloy, or a combination of these materials. In the example well system 100 of FIG. 1, the catalyst 136 takes the form of a tubular catalyst with a tubular catalyst surface disposed in a horizontal well extending between the injection well 102 and the production well 112 and through the reservoir 124. Completion operations for horizontal wells can vary, for example, based on the type of completion. For example, the horizontal well can form an open hole completion, a slotted liner in an open hole portion (with or without blank sections and external casing packers), cased and cemented completion with perforations, or another completion type. A catalyst can be integrated into a portion of a horizontal well completion, for example, to promote a dehydrogenation of methane in the reservoir 124. The tubular catalyst surface allows for the heated fluid composition to flow within the tubular catalyst with the reservoir fluid adsorbed on an outer surface of the tubular catalyst. However, the catalyst 136 can take a variety of other forms. For example, the catalyst can be injected into a horizontal well portion between a tubing and a formation wall of the reservoir 124. An example catalyst is described in greater detail later with regards to FIG. 3.

As a result of the in-situ methane pyrolysis reactions occurring within the reservoir 124, the methane in the reservoir fluid is at least partially converted to hydrogen gas and solid carbon. Because these chemical reactions occur within the reservoir 124, the natural formation of the rock within and surrounding the reservoir naturally adsorbs some of these carbon-containing materials, such as CO, $CO_2$, and solid carbon. Natural adsorption of the rock formation can include the adsorption of 50% or more of the $CO_2$, CO, or both, resulting from these chemical reactions. As a result of these reactions and natural adsorption, the resulting production fluid that flows from the reservoir 124 to the surface 108 through the production well 112 has a greater concentration of hydrogen gas and a lower concentration of methane and carbon-containing components, such as CO and $CO_2$.

In some implementations, the fluid control system 110 includes a controller 138, such as a computer system and controller, that is communicably coupled to the components of the fluid control system 110, to the injection control valve 128, or both, to control operation of the injection control valve 128. For example, the injection control valve 128 can include or be connected to one or more computers that transmit and receive information to and from the controller 138 to assess characteristics of the flow of the fluid composition at the injection control valve 128, and communicate instructions to operate components of the fluid control system 110 to maintain or adjust characteristics of the fluid composition, such as temperature, pressure, flow rate, or a combination of these. In other instances, the injection control valve 128 is standalone, in that it includes a controller integrated into the control valve 128 to control operation of the injection control valve 128. The fluid control system 110 can include a power source to provide electrical power to the components of the fluid control system 110, and the controller 138 can control the power supply to these components. In operation, the controller 138 receives data representing fluid characteristics of the fluid composition in the injection fluid pathway 126, fluid characteristics of the production fluid from the production fluid pathway 130, or both.

The controller 138 can control operation of the injection control valve 128, heater 134, production control valve 132, or other components of the example well system 100, based on the determined fluid characteristics. In some instances, the fluid control system 110 can include a fluid sensor in fluid communication with the production fluid to sense a characteristic of the production fluid flowing from the production well 112, and control operation of the injection control valve 128, heater 134, or both, based on a sensed characteristic of the production fluid. For example, the sensor can determine a percent volume of $CO_2$ in the production fluid from the production well 112, and the controller can operate the injection control valve 128, heater 134, or both, based on the sensed percent volume of $CO_2$ in the production fluid received from the production well. The percent volume of $CO_2$ in the produced fluid can be indicative of unwanted chemical reactions occurring downhole. In some examples, the controller 138 increases a flow rate of the heated fluid composition into the reservoir 124 based on the percent volume of $CO_2$ being above a threshold value of $CO_2$ percent volume, for example, to increase the downhole methane pyrolysis and decrease an amount of produced $CO_2$. In certain examples, the controller 138 senses a temperature of the fluid composition, production fluid from the production well 112, or both, and operates to decrease a temperature of the heated fluid composition into the reservoir 124, such as to avoid overheating of the fluid composition or the reservoir fluid. In some implementations, the controller 138 regulates the residence time of the heated fluid composition injected into the reservoir, the temperature within the reservoir, the catalyst component 136, or a combination of these features and components.

Figure 2:
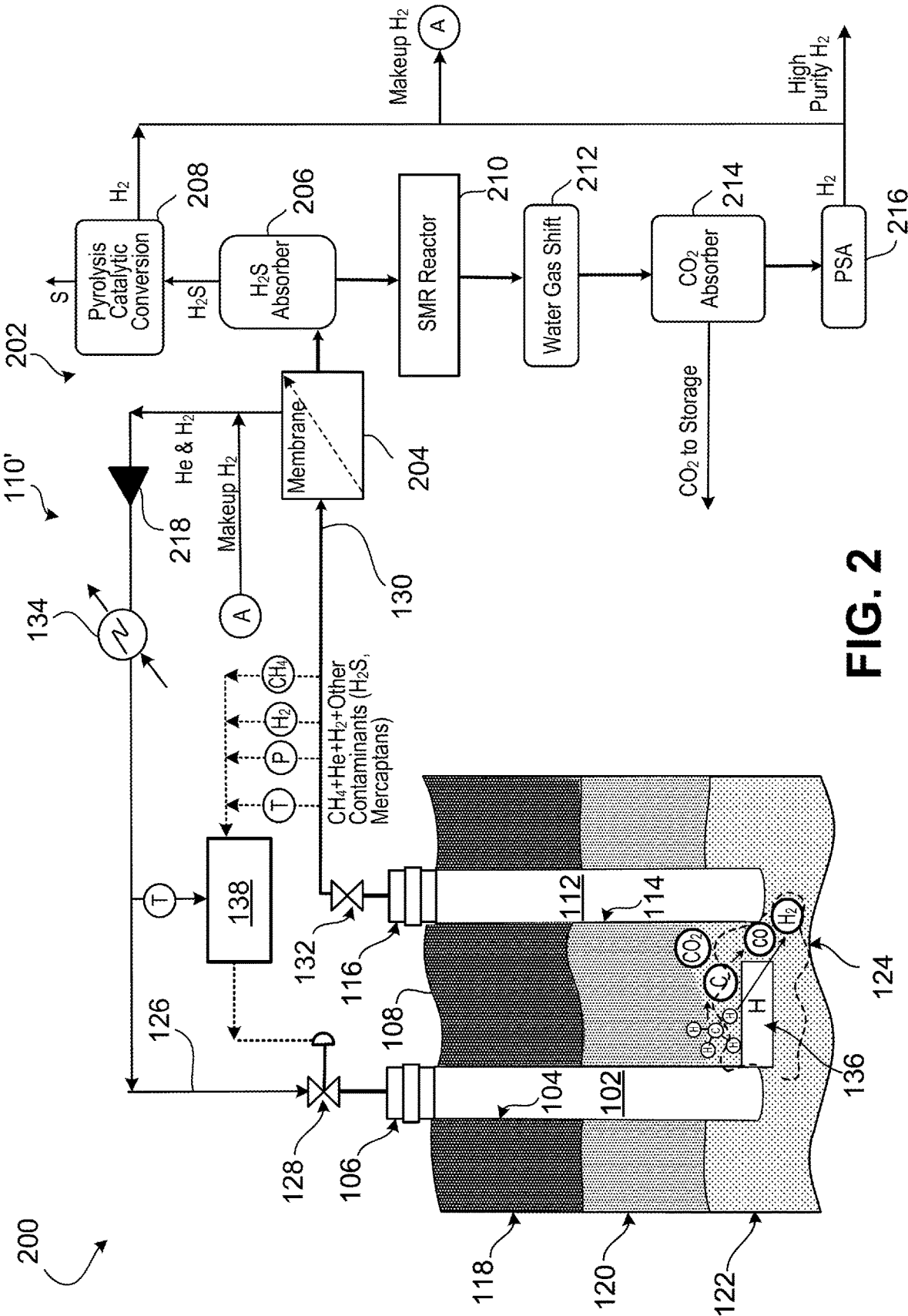
FIG. 2 is a schematic partial cross-sectional view of a second example well system that includes a second fluid control system that can be used in example well system of FIG. 1.

FIG. 2 is a schematic partial cross-sectional view of a second example well system 200 that includes a fluid control system 110' that can be used in example well system 100 of FIG. 1. The second example well system 200 is the same as the example well system 100 of FIG. 1, except that the fluid control system 110' of the second example well system 200 also includes processing equipment 202 for processing the production fluid received from the production well 112.

The hydrogen gas, helium, or both, that form the fluid composition that the fluid control system 110' guides and heats with the heater 134 can be extracted in full or in part from the production fluid, for example, using the processing equipment 202 that separates the hydrogen from the production fluid. Helium can be found in natural gas reservoirs, and can be extracted on the surface employing cryogenic methods or a membrane system. Hydrogen can be is produced from natural gas, for example, employing SMR. The processing equipment 202 includes a membrane system and SMR technology to conduct this extraction. Some of the processing equipment 202 generates heat, which can be used with or integrated into the heater 134 to aid in heating the fluid composition. For example, water gas shift operations can result in hydrogen gas temperatures of around 500° C., which can be utilized with the heating of the fluid composition.

In the second example well system 200 of FIG. 2, the processing equipment 202 of the example fluid control system 110' includes a membrane system 204, a hydrogen sulfide ($H_2S$) absorber 206, a hydrogen converter 208 (such as a methane pyrolysis converter or catalytic converter), an SMR reactor 210, a water gas shift unit 212, a $CO_2$ absorber 214, and a pressure swing adsorber (PSA) 216. The membrane system 204 receives the production fluid from the production well 112, and acts to separate the hydrogen gas and helium from the remainder of the production fluid. The membrane system 204 can direct the separated hydrogen gas and helium to the second fluid control system 110' so that it can be directed to the heater 134 and eventually re-injected in the reservoir 124 for in-situ methane pyrolysis. In some implementations, the separated hydrogen gas and helium mixture from the membrane system 204 can be supplemented with additional hydrogen gas, for example, from the hydrogen converter 208, the PSA 216, or both. The remainder of the production fluid from the membrane system 204 flows to the $H_2S$ absorber 206, where the production fluid is further processed to remove $H_2S$, carbon components, or both. The clean gas from the $H_2S$ absorber 206 is sent to the SMR reactor 210 for production of syngas ($CO+H_2$). The syngas from the SMR reactor 210 can be further shifted in the water gas shift reactor 212, for example, to $H_2$ and $CO_2$. The resultant product including the $CO_2$ and $H_2$ is sent to the $CO_2$ absorber 214, for example, to separate $CO_2$ and hydrogen from the production fluid.

In some implementations, the fluid control system 110' of the second example well system 200 also includes a compressor 218 that compresses the helium and hydrogen gas received from the processing equipment 202 in preparation for heating by the heater 134. In some instances, the compressor 218 compresses the helium and hydrogen gas mixture to a pressure equivalent to or similar to (such as within 10 percent of) the operating pressure of the reservoir fluid in the reservoir 124. The controller 138 can receive data from sensors in fluid communication with the production fluid in the production fluid pathway 130 that are representative of the temperature, pressure, hydrogen content, methane content, or other fluid characteristics of the production fluid, and can receive data from a sensor in the injection fluid pathway 126 representing the temperature or other fluid characteristics of the heated fluid composition flowing out of the heater 134. The controller 138 can also operate the injection control valve 128 based on one or more or all of these fluid characteristics, for example, to optimize the in-situ methane pyrolysis, control the environment downhole at the reservoir 124, or both.

Figure 3:
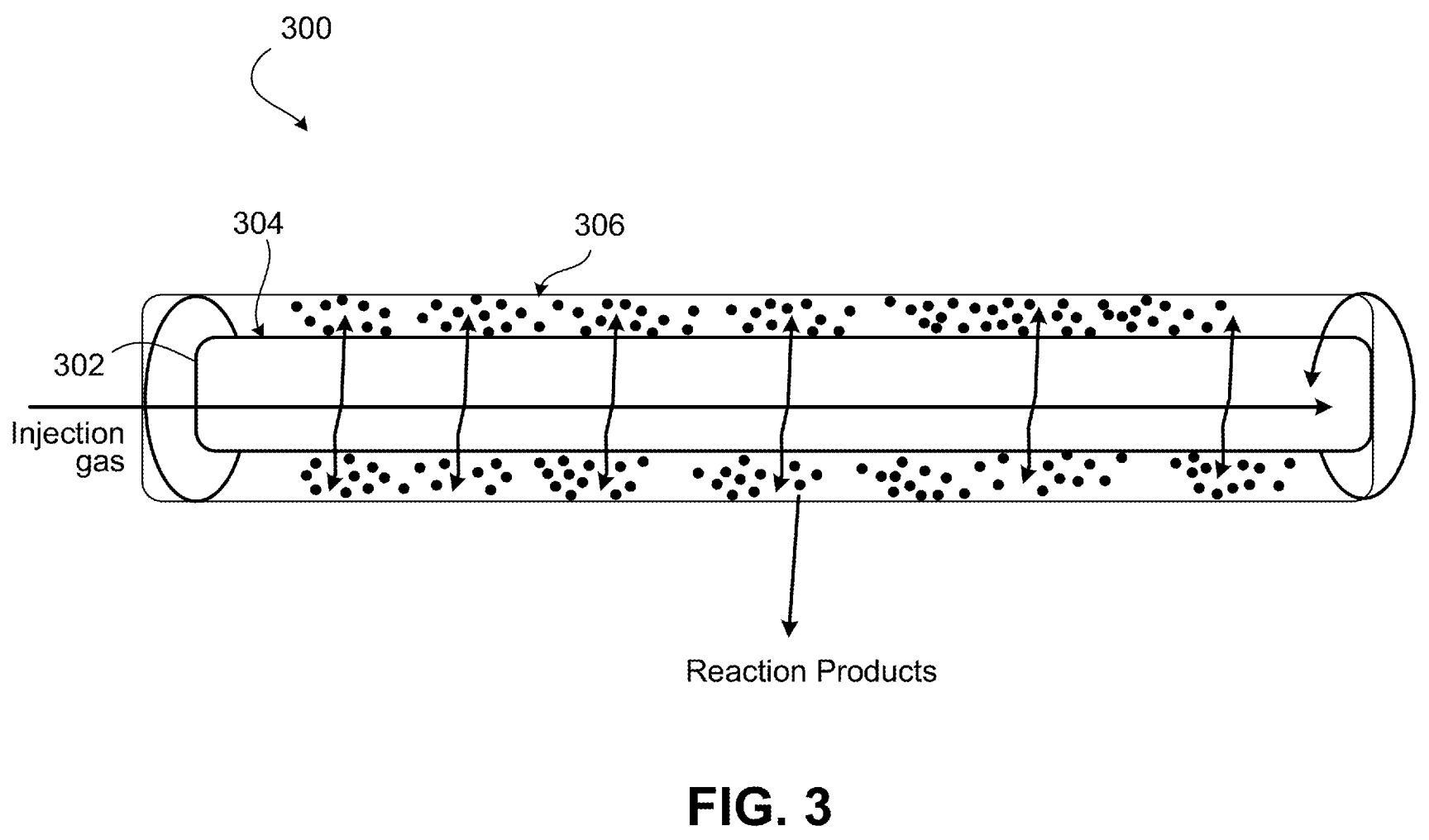

FIG. 3 is a schematic partial cross-sectional side view of an example catalyst 300 that can be used in the example well system 100 of FIG. 1 or the second example well system 200 of FIG. 2. For example, the example catalyst 300 can be implemented into the catalyst 136 of FIGS. 1 and 2. The example catalyst 300 includes a tubular catalyst body 302 with a hollow central bore and a catalyst surface 304. The catalyst surface 304 acts as an adsorption surface that promotes a chemical reaction between a fluid flowing through the tubular catalyst body 302 and a fluid residing exterior to the tubular catalyst body 302. The tubular catalyst body 302 resides in a horizontal wellbore 306 in a reservoir (such as the reservoir 124 of the example well system 100 of FIG. 1), and extends partially or completely between an injection wellbore and a production wellbore (such as the injection well 102 and production well 112 of the example well system 100 of FIG. 1). The example catalyst 300 receives a heated fluid composition including hydrogen gas and helium, and the heated fluid composition flows through the central bore of the tubular catalyst body 302 and contacts the catalyst surface 304. In some implementations, the catalyst surface 304 includes openings, such as perforations, slotted liners, sand screens, a combination of these, or other apertures to promote fluid flow and reaction between an injection fluid and methane.

The heated fluid composition reacts with hydrocarbon fluid residing in the horizontal wellbore 306. The example catalyst 300 aids in the dehydrogenation of methane in the heated fluid composition, such as the methane that had not yet undergone pyrolysis. The catalyst surface 304 can include a catalyst material with an affinity for molecular adsorption, where methane is adsorbed on the catalyst surface, and is then dissociated following a sequence of dehydrogenation reactions. The catalyst material can vary. In some examples, the catalyst material includes iron, cobalt, nickel, another alloy, or a combination of these materials. The tubular catalyst surface 304 allows for the heated fluid composition to flow within the tubular catalyst body 302 with the methane adsorbed on the catalyst surface 304. In operation, the heated hydrogen in the fluid composition intermixes with the methane residing in the horizontal wellbore 306, such as the methane adsorbed on the catalyst surface 304, and the applied heat from the fluid composition initiates methane pyrolysis in the reservoir fluid. As a result of these reactions, the resultant products include hydrogen gas, CO, $CO_2$, solid carbon, and any methane that did not undergo pyrolysis. At least some of the CO, $CO_2$, or solid carbon are adsorbed by the formation surrounding the horizontal wellbore 306 such that they are retained within the formation. The remainder of these resultant reaction products can then flow to the surface through a production well for production fluid processing.

FIG. 4 is a flowchart describing an example method 400 for in-situ pyrolysis of methane, for example, performed by the example well system 100 of FIG. 1 or the second example well system 200 of FIG. 2. At 402, a heater of a fluid control system heats a fluid composition including hydrogen gas to a first temperature that is greater than or equal to 300° C. At 404, the heated fluid composition is directed to a subterranean reservoir. At 406, the heated fluid composition is disposed in contact with a reservoir fluid in the subterranean reservoir to cause methane pyrolysis of the reservoir fluid. In some instances, the heated fluid composition includes hydrogen gas and helium. Helium can act as a heat carrier component of the fluid composition, for example, to maintain a minimum threshold temperature of the heated fluid composition when the heated composition fluid reaches the subterranean reservoir. The heated fluid composition can flow to or toward the reservoir through a well, such as through a tubing disposed in a wellbore of an injection well. The fluid composition can be heated at a surface facility, such as at a processing facility fluidly connected to the fluid control system. The hydrogen gas, helium, or both, directed to the heater can be from a processed production fluid from the mentioned subterranean reservoir, from a different reservoir, or both. The heater can take a variety of forms to transmit heat to the fluid composition, such as heat from solar energy, process heat, combustion heat, or a combination of these. The fluid composition can be heated to a temperature between 300° C. and 500° C. In some implementations, in response to heated fluid composition contacting the reservoir fluid, some or all of the reservoir fluid is converted into components of hydrogen, carbon monoxide, carbon dioxide, solid carbon, or a combination of these components. In some examples, mixing the fluid composition with the reservoir fluid includes the use of a catalyst disposed within the subterranean reservoir. The catalyst aids in enhancing the dehydrogenation of methane and promoting the methane pyrolysis of the reservoir fluid. In certain implementations, a flow control valve controls a flow of the heated fluid composition from the fluid control system to the subterranean reservoir. The fluid control system can include a controller for controlling the flow control valve, such that the temperature, pressure, flow rate, or a combination of these characteristics of the heated fluid composition are according to a desired set of characteristics. In some instances, the controller controls the temperature, pressure, or flow rate of the heated fluid composition based on a characteristic of a production fluid flow from a production well fluidly connected to the subterranean reservoir. For example, the controller can operate the flow control valve based on an amount or percent volume of $CO_2$ in the production fluid received from the production well. In some examples, the controller increases a flow rate of the heated fluid composition into the subterranean reservoir based on percent volume of $CO_2$ being above a threshold value of $CO_2$ percent volume.

EXAMPLES

In a first aspect, method for in-situ pyrolysis of methane comprises heating, with a heater of a fluid control system, a fluid composition comprising hydrogen gas to a first temperature greater than or equal to 300 degrees Celsius; directing the heated fluid composition to a subterranean reservoir; and disposing the heated fluid composition in contact with a reservoir fluid in the subterranean reservoir to cause methane pyrolysis of the reservoir fluid.

In a second aspect according to the first aspect, directing the heated fluid composition comprises flowing the heated fluid composition through a well toward the subterranean reservoir.

In a third aspect according to the second aspect, the well comprises an injection well.

In a fourth aspect according to any one of the first aspect to the third aspect, heating the fluid composition comprises heating the fluid composition at a surface facility of a well system.

In a fifth aspect according to the fourth aspect, heating the fluid composition at the surface facility comprises heating the fluid composition using at least one of solar energy, process heat, or combustion heat.

In a sixth aspect according to any one of the first aspect to the fifth aspect, heating the fluid composition comprises heating the fluid composition to the first temperature between 300 degrees Celsius and 500 degrees Celsius.

In a seventh aspect according to any one of the first aspect to the sixth aspect, the fluid composition further comprises helium.

In an eighth aspect according to any one of the first aspect to the seventh aspect, disposing the heated fluid composition in contact with the reservoir fluid comprises promoting contact, with a catalyst disposed within the subterranean reservoir, the heated fluid composition with the reservoir fluid.

In a ninth aspect according to any one of the first aspect to the eighth aspect, the method further comprises controlling, with a flow control valve, a flow of the heated fluid composition toward the subterranean reservoir.

In a tenth aspect according to any one of the first aspect to the ninth aspect, directing the heated fluid composition comprises flowing the heated fluid composition through an injection well of a well system toward the subterranean reservoir, and the method further comprises receiving, at a surface facility of the well system, a production fluid flow from a production well in fluid communication with the subterranean reservoir.

In an eleventh aspect according to the tenth aspect, the method further comprises controlling, with a controller, at least one of the temperature, pressure, or flow rate of the heated fluid composition prior to directing the heated fluid composition to the subterranean reservoir.

In a twelfth aspect according to the eleventh aspect, controlling the heated fluid composition comprises controlling the at least one of the temperature, pressure, or flow rate of the heated fluid composition based on a characteristic of the production fluid flow from the production well.

In a thirteenth aspect, a fluid injection system for a well comprises a fluid control system comprising a heater configured to heat a fluid composition comprising hydrogen gas to a first temperature that is greater than or equal to 300 degrees Celsius; an injection fluid pathway between the fluid control system and an injection tubing at a well head at a well site, the injection fluid pathway configured to direct a flow of the heated fluid composition from the fluid control system to the injection tubing; and a catalyst disposed in a subterranean reservoir and fluidly connected to the injection fluid pathway to receive the heated fluid composition, the catalyst configured to promote contact between the heated fluid composition and a reservoir fluid in the subterranean reservoir to cause methane pyrolysis.

In a fourteenth aspect according to the thirteenth aspect, the fluid control system is disposed at a surface facility of the well site.

In a fifteenth aspect according to the thirteenth aspect or the fourteenth aspect, the fluid composition further comprises helium.

In a sixteenth aspect according to any one of the thirteenth aspect to the fifteenth aspect, the injection fluid pathway comprises a control valve to control at least one of a temperature, pressure, or flow rate of the heated fluid composition.

In a seventeenth aspect according to the sixteenth aspect, the fluid injection system further comprises a controller communicably coupled to the control valve, the controller configured to control operation of the control valve.

In an eighteenth aspect according to the seventeenth aspect, the fluid injection system further comprises a production fluid pathway between the fluid control system and a production tubing at a second well head at the well site, the production fluid pathway configured to direct a flow of a production fluid from the production tubing to the fluid control system.

In a nineteenth aspect according to the eighteenth aspect, the fluid injection system further comprises a fluid sensor in fluid communication with the production fluid and configured to sense a characteristic of the production fluid, where the controller is communicably connected to the fluid sensor and configured to control the control valve based at least partially on the characteristic of the production fluid.

In a twentieth aspect, a well system comprises a fluid control system at a surface of an injection well, the fluid control system comprising a heater configured to heat a fluid composition comprising hydrogen gas and helium to a first temperature that is between 300 degrees Celsius and 500 degrees Celsius; and an injection fluid pathway extending between the fluid control system and a subterranean reservoir, the injection well comprising a wellbore extending to the subterranean reservoir, and the injection fluid pathway configured to direct a flow of the heated fluid composition from the fluid control system to the subterranean reservoir and into contact with a reservoir fluid in the subterranean reservoir to cause in-situ methane pyrolysis.

While this disclosure contains many specific implementation details, these should not be construed as limitations on the scope of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described above should not be understood as requiring such separation in all implementations, and it should be understood that the described components and systems can generally be integrated together in a single product or packaged into multiple products.

Thus, particular implementations of the subject matter have been described. Other implementations are within the scope of the following claims. Various modifications may be made without departing from the spirit and scope of the disclosure. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method for in-situ pyrolysis of methane, the method comprising:

heating, with a heater of a fluid control system at a surface facility of a well system, a fluid composition comprising hydrogen gas and helium to a first temperature greater than or equal to 300 degrees Celsius;

directing the heated fluid composition to a subterranean reservoir;

disposing the heated fluid composition in contact with a reservoir fluid in the subterranean reservoir to cause methane pyrolysis of the reservoir fluid, wherein disposing the heated fluid composition in contact with the reservoir fluid comprises transmitting heat from the helium of the fluid composition obtained at the surface facility to the reservoir fluid;

separating, via a membrane system, hydrogen gas and helium from a remainder of a production fluid from a production well; and directing the separated hydrogen gas and helium to the fluid composition at the heater.

2. The method of claim 1, wherein directing the heated fluid composition comprises flowing the heated fluid composition through a well toward the subterranean reservoir.

3. The method of claim 2, wherein the well comprises an injection well.

4. The method of claim 1, wherein heating the fluid composition at the surface facility comprises heating the fluid composition using at least one of solar energy, process heat, or combustion heat.

5. The method of claim 1, wherein heating the fluid composition comprises heating the fluid composition to the first temperature between 300 degrees Celsius and 500 degrees Celsius.

6. The method of claim 1, wherein disposing the heated fluid composition in contact with the reservoir fluid comprises promoting contact, with a catalyst disposed within the subterranean reservoir, of the heated fluid composition with the reservoir fluid.

7. The method of claim 1, further comprising controlling, with a flow control valve, a flow of the heated fluid composition toward the subterranean reservoir.

8. The method of claim 1, wherein directing the heated fluid composition comprises flowing the heated fluid composition through an injection well of the well system toward the subterranean reservoir, the method further comprising:

receiving, at the surface facility of the well system, a production fluid flow from a production well in fluid communication with the subterranean reservoir.

9. The method of claim 8, further comprising controlling, with a controller, at least one of the temperature, pressure, or flow rate of the heated fluid composition prior to directing the heated fluid composition to the subterranean reservoir.

10. The method of claim 9, wherein controlling the heated fluid composition comprises controlling the at least one of the temperature, pressure, or flow rate of the heated fluid composition based on a characteristic of the production fluid flow from the production well.

11. The method of claim 8, wherein disposing the heated fluid composition in contact with the reservoir fluid comprises promoting contact, with a catalyst pack disposed in a horizontal well extending between the injection well and the production well, of the heated fluid composition with the reservoir fluid.

12. A fluid injection system for a well, the fluid injection system comprising:

a fluid control system comprising a heater and a membrane system, the heater configured to heat a fluid composition comprising hydrogen gas and helium to a first temperature that is greater than or equal to 300 degrees Celsius, and the membrane system configured to separate hydrogen gas and helium from a remainder of a production fluid from a production well and supply the separated hydrogen gas and helium to the fluid composition;

an injection fluid pathway between the fluid control system and an injection tubing at a well head at a well site, the injection fluid pathway configured to direct a flow of the heated fluid composition from the fluid control system to the injection tubing; and a catalyst disposed in a subterranean reservoir and fluidly connected to the injection fluid pathway to receive the heated fluid composition, the catalyst configured to promote contact between the heated fluid composition and a reservoir fluid in the subterranean reservoir to cause methane pyrolysis and transmission of heat from the helium to the reservoir fluid.

13. The fluid injection system of claim 12, wherein the fluid control system is disposed at a surface facility of the well site.

14. The fluid injection system of claim 12, wherein the injection fluid pathway comprises a control valve to control at least one of a temperature, pressure, or flow rate of the heated fluid composition.

15. The fluid injection system of claim 14, wherein the fluid injection system further comprises a controller communicably coupled to the control valve, the controller configured to control operation of the control valve.

16. The fluid injection system of claim 15, further comprising a production fluid pathway between the fluid control system and a production tubing at a second well head at the well site, the production fluid pathway configured to direct a flow of a production fluid from the production tubing to the fluid control system.

17. The fluid injection system of claim 16, further comprising a fluid sensor in fluid communication with the production fluid and configured to sense a characteristic of the production fluid, wherein the controller is communicably connected to the fluid sensor and configured to control the control valve based at least partially on the characteristic of the production fluid.

18. A well system, comprising:

a fluid control system at a surface of an injection well, the fluid control system comprising a heater configured to heat a fluid composition comprising hydrogen gas and helium to a first temperature that is between 300 degrees Celsius and 500 degrees Celsius, and comprising a membrane system configured to separate hydrogen gas and helium from a remainder of a production fluid from a production well and supply the separated hydrogen gas and helium to the fluid composition; and an injection fluid pathway extending between the fluid control system and a subterranean reservoir, the injection well comprising a wellbore extending to the subterranean reservoir, and the injection fluid pathway configured to direct a flow of the heated fluid composition from the fluid control system to the subterranean reservoir and into contact with a reservoir fluid in the subterranean reservoir to cause in-situ methane pyrolysis.

* * * * *